Dec. 23, 1930.  A. DAVIS, JR  1,785,729
SAFETY DEVICE FOR TANKS
Filed Nov. 4, 1927  2 Sheets-Sheet 1

INVENTOR
Augustine Davis, Jr.
BY
ATTORNEY

Dec. 23, 1930.  A. DAVIS, JR  1,785,729
SAFETY DEVICE FOR TANKS
Filed Nov. 4, 1927  2 Sheets-Sheet 2
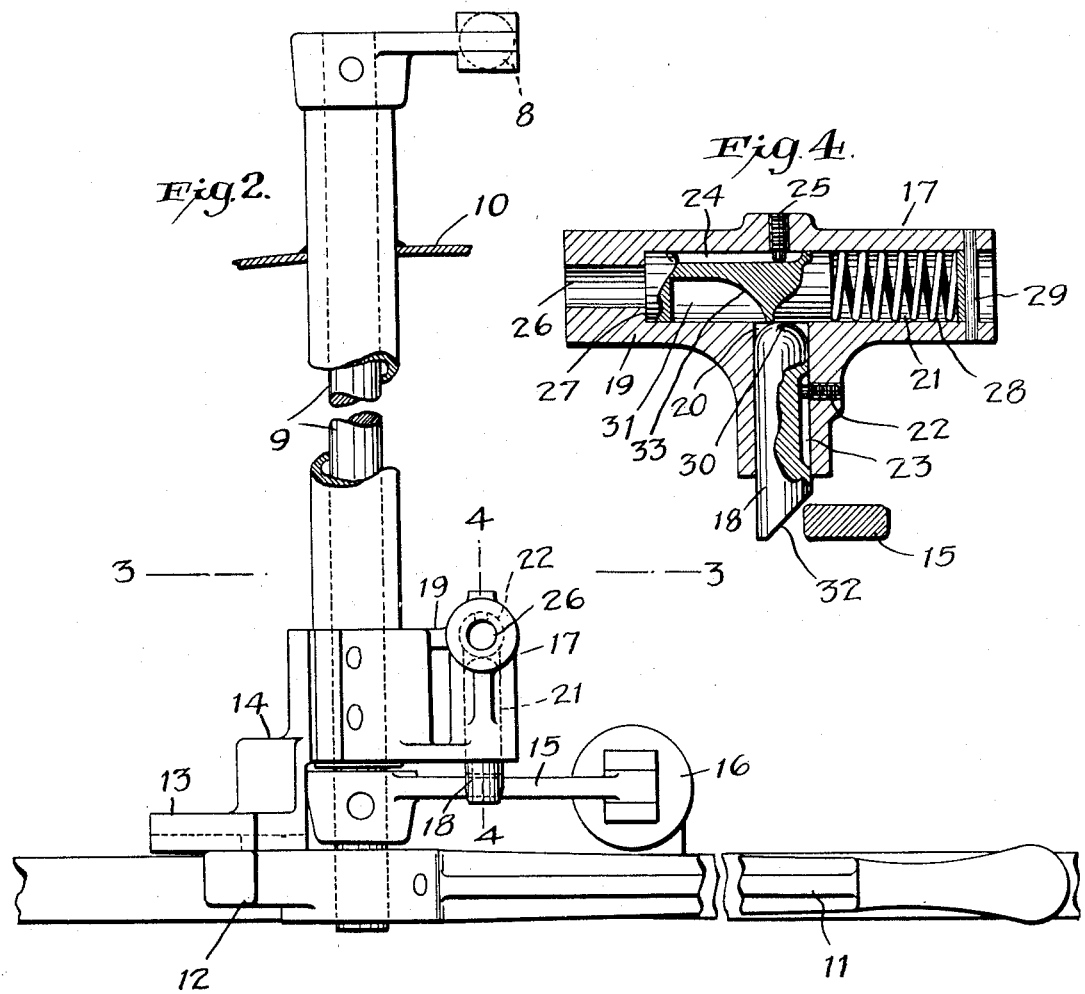
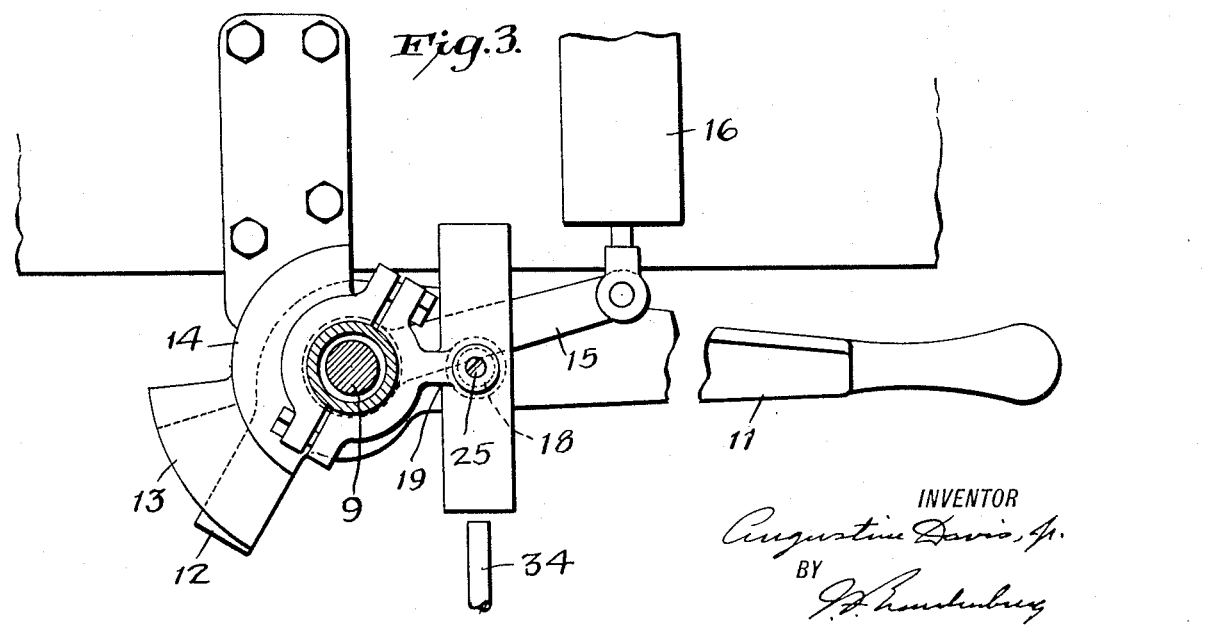

Patented Dec. 23, 1930

1,785,729

UNITED STATES PATENT OFFICE

AUGUSTINE DAVIS, JR., OF CINCINNATI, OHIO

SAFETY DEVICE FOR TANKS

Application filed November 4, 1927. Serial No. 231,116.

The invention has reference to tanks, such as truck tanks from which deliveries of gasolene or other inflammable liquids are made, and to the valves and valve mechanism controlling outflow of liquid from such tanks. The object is to provide means whereby the tank and/or its delivery passage or passages are caused to be electrically connected with ground when or before the valve or valves are opened for the making of a delivery, in order to dissipate any charge of static electricity which may exist or which may be generated by the outflow of liquid, and which might ignite the liquid or its vapors at the point of discharge from the tank.

This invention relates more specifically to provisions of this character devised in connection with the normally closed safety outlet valves, or emergency valves as they are frequently termed, located within the tank at the entrances to the outlet passages, or possibly in the tank-ward portions of such passages, which valves keep the gasolene from being discharged in event of injury to the piping or faucets or other valves located in the outer portions of the piping, or in event of leaks developing in these valves.

In a copending application, Serial No. 231,117, of even date herewith, I disclose a form of means or device for preventing opening of the faucets or external valves except when the tank is grounded, and the invention generic to both examples is intended to be claimed broadly herein, claims being also made herein generally and specifically to the embodiment shown in the accompanying drawings.

In the said drawings:

Fig. 2 is a rear elevation of parts within the box with intermediate portions broken out for economy of space;

Fig. 3 is a sectional plan on the line 3—3 of Fig. 2; and

Fig. 4 is a section on the line 4—4 of Fig. 2.

Figure 1:
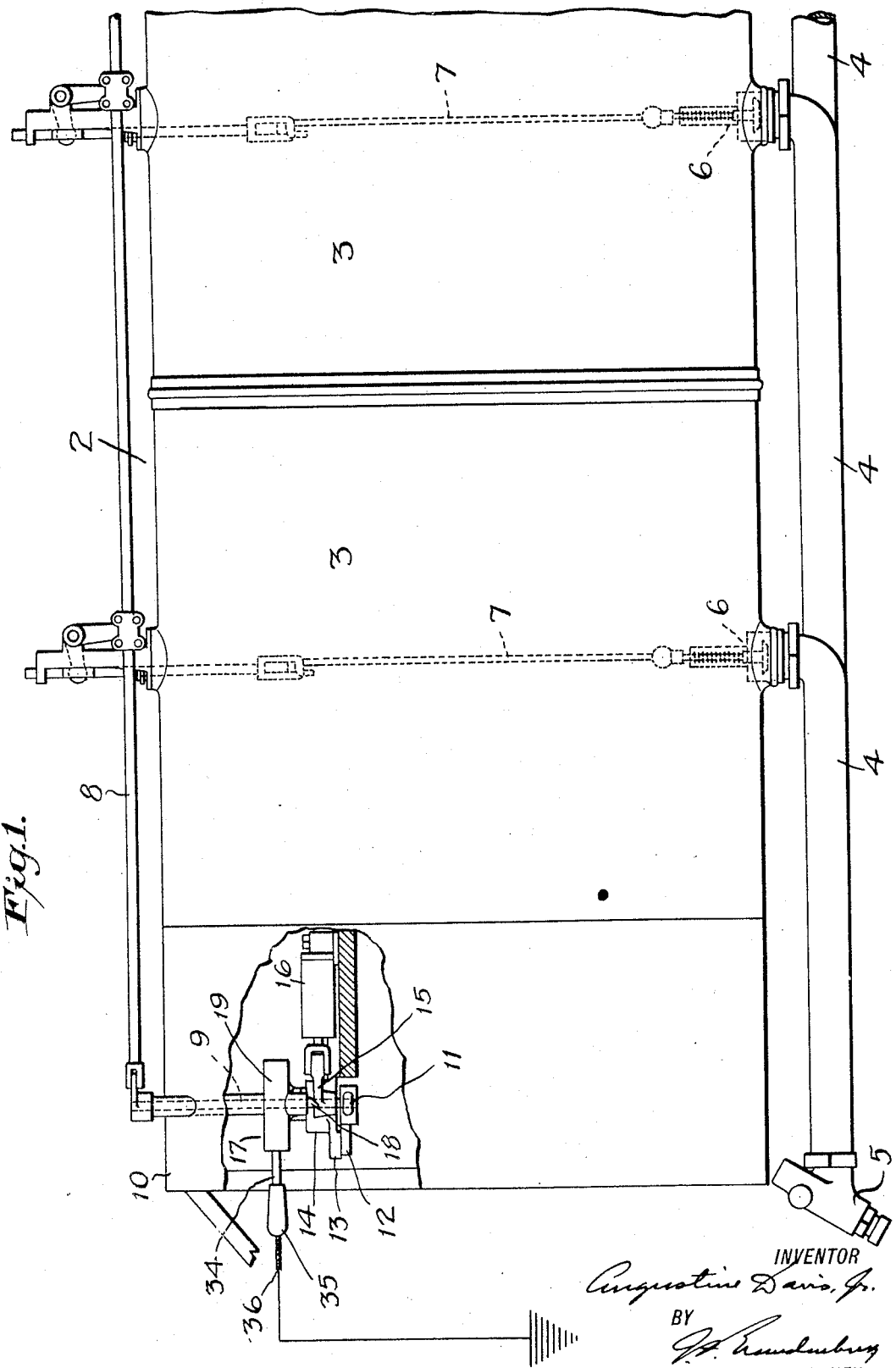
Fig. 1 is a side elevation of a portion of a truck-tank embodying the invention, a portion of the wall of a box forming the rear end of the tank structure being broken out and a portion of the door of the box being shown in partly open position.

The drawing illustrates a multiple compartment truck tank 2 comprising a number of separate compartments or chambers 3. The tank shown has an outlet opening in the bottom of each compartment, with delivery pipes 4 extending beneath the tank from the several openings, to the rear end of the vehicle, where they are provided with faucets 5. However, the invention is not limited to the specific plan for withdrawing the contents of the tank or to the specific location and arrangement of outlets, piping and valves. Thus, there are tanks in which the conduits are arranged for siphoning off the gasolene, and in such tanks it is customary to place normally closed safety valves in the piping within the compartments.

In the tank illustrated, spring-seated safety or emergency valves 6 of known kind, preferably located in the lower portions of the tank compartments, close the outlets so as to retain the liquid within the tank enclosure, or to keep it from reaching portions of the delivery piping subject to injury in event of accident, likewise to keep it from escaping if the faucets or outer valves should leak or become damaged or be mischievously opened.

Operating connections 7 extend upward from the several valves 6 through the top of the tank and are connected or operatively related with a control rod 8, which passes lengthwise of the tank. At the rear end this rod is connected with an operating rock-shaft 9, which passes downward through the top of a box 10. An operating hand lever 11 within the box is connected to the latter shaft. This mechanism is representative generally of suitable valve mechanism for operating one or a plurality of tank valves, whether conjointly or separately.

It may be understood that means are provided for holding the mechanism in position with a valve or valves open while a delivery is being made. For this purpose the tail 12 of the lever 11 may be caught behind a lug 13 on a bracket 14. A valve mechanism of this description is disclosed in the Davis & Betts Patent No. 1,562,800, dated November 17, 1925.

In this particular mechanism an arm 15 fixed to the shaft 9 and connected with an air-check 16, as in the Betts Patent, No. 1,552,030, dated September 1, 1925, is selected as a suitable part of the mechanism for cooperation with a locking device 17 which is to be released, or from which the valve mechanism is to be released, by a means which causes the tank to be connected electrically with ground. The locking device includes a bolt or plunger 18 which normally interferes with movement of the arm 15 in the direction in which it must move when the mechanism is operated to open the valves.

The form of the device may be varied. Preferably it comprises a casting 19 secured to the bracket 14, the casting having two intersecting bores 20 and 21. The plunger 18 is slidable in the bore 20, where it is kept from turning by a screw 22 which enters a longitudinal slot 23 in the plunger. In the other bore is a plunger 24, similarly kept from turning by a screw 25. One end 26 of the bore 21 is reduced to form a shoulder 27 against which the plunger 24 is normally held by a spring 28, the spring being retained by a cross-pin 29.

In this position the rounded inner end of the bolt plunger 18 is blocked against the side of the plunger 24 at 30, and consequently the outer end of the plunger 18 is held in projecting position where it interferes with movement of the arm 15.

The plunger 24, forwardly of its blocking surface, is recessed at 31 in a manner to permit the plunger 18 to recede when the plunger 24 is moved rearward against the action of the spring 28. The projecting end of the plunger 18 is sloped at 32 so that when the valve mechanism is operated to open the valve, the arm 15 cams the plunger 18 upward or inward into the recess 31. While the valve mechanism remains in the valve-open position the end of the plunger 18 bears upon the face of the arm 15, so that this plunger is held in its inward or raised position, thereby holding the plunger 24 against being pushed forward by the spring. The rear wall 33 of the recess 31 is sloped, so that, when the valve mechanism is restored to the valve-closed position, the plunger 24, urged by its spring, again projects the plunger 18 into locking or interfering relation with the arm 15.

The construction of the lock may, however, be varied.

The means for releasing, disengaging or unlocking the lock comprises a metal rod 34 projecting from a handle grip 35, the rod being designed to enter slidably in the socket 26. This rod is both a grounding plug and an unlocking key, and is located at a station where delivery of gasolene is to be made, being connected by a conductor cable 36 with ground, so that when the valve mechanism is unlocked, the tank, including its delivery conduits 4, is electrically connected with an actual ground, thus carrying off any static electricity from the tank or its piping, before and during the delivery of the inflammable liquid. A static charge may exist in the tank, or static electricity may be generated by the friction of the outflowing stream. It will be apparent that the lock and receptacle 17 is in electrical conducting relation with the metal of the tank and its delivery piping, and through the metal with the liquid. The grounding key remains in the receptacle during the delivery.

The illustrated embodiment of the invention has been described in detail in order to give a clear understanding of a specific application. I wish it to be understood, however, that the broad invention may be carried out in a variety of forms, another form being disclosed in my copending application where the lock prevents the application of a separate or detachable operating device for opening a valve or valves, in that instance faucet valves. In the present embodiment a lock, which is released by an electrical grounding device, prevents the operation of a valve operating means. It will suggest itself that, instead of a lock which prevents operation, there may be other means for carrying out the general aspect of the invention which comprises provisions whereby the outlet valve mechanism of a tank is ordinarily inoperative to open the valves, but is rendered operative for that purpose by the application or insertion of a grounding device, in order to safeguard deliveries of liquid from the tank.

What I claim as new is:

1. The combination of a tank having an outlet passage through which liquid is withdrawn from the lower portion of the tank, a valve for opening and closing said passage, a lock for preventing opening of said valve, and means adapted to be applied to release said lock and by such application to electrically ground the tank prior to the discharge of liquid from said outlet passage.

2. In connection with a tank, the combination with an internally disposed normally closed valve commanding the outlet from the tank, and mechanism operable externally of the tank for controlling said valve, of a lock for preventing operation of said mechanism to open the valve within the tank, and means adapted to be applied for release of said lock and by such application to electrically ground the tank.

3. In connection with a tank, the combination with an internally disposed normally closed valve commanding the outlet from the tank, and mechanism operable externally of the tank for controlling said valve, said mechanism having an arm connected thereto, of a locking device having a bolt which blocks movement of said arm in the direction corresponding to opening of the valve within the tank, and means adapted to be applied to said locking device for releasing the valve operating mechanism and by such application to electrically ground the tank.

4. In connection with a tank having an outlet passage leading from the lower portion of the tank, an automatic closing valve commanding said passage, valve mechanism for opening said valve, a locking device cooperative with said valve mechanism to oppose operation thereof in order to prevent opening of the valve, and means adapted to be applied to release the valve mechanism and by such application to electrically ground the tank prior to the discharge of liquid from said outlet passage.

5. In connection with a tank having an outlet passage leading from the lower portion of the tank, a valve commanding said passage, valve mechanism for opening said valve, means whereby said valve mechanism is normally inoperative to open said valve, and electrical grounding means adapted to be applied to render said mechanism operative to open said valve, thereby grounding the tank prior to the discharge of liquid from said outlet passage.

6. In connection with a multiple compartment vehicle tank with outlet passages from the several compartments, valves commanding the several outlet passages, a common valve mechanism for operating said valves, means whereby said valve mechanism is rendered inoperative to open said valves, and electrical grounding means adapted to be applied to render said mechanism operative to open said valves.

AUGUSTINE DAVIS, Jr.